No. 754,448. PATENTED MAR. 15, 1904.
J. HENRY.
PNEUMATIC STACKER.
APPLICATION FILED APR. 24, 1903.
NO MODEL.
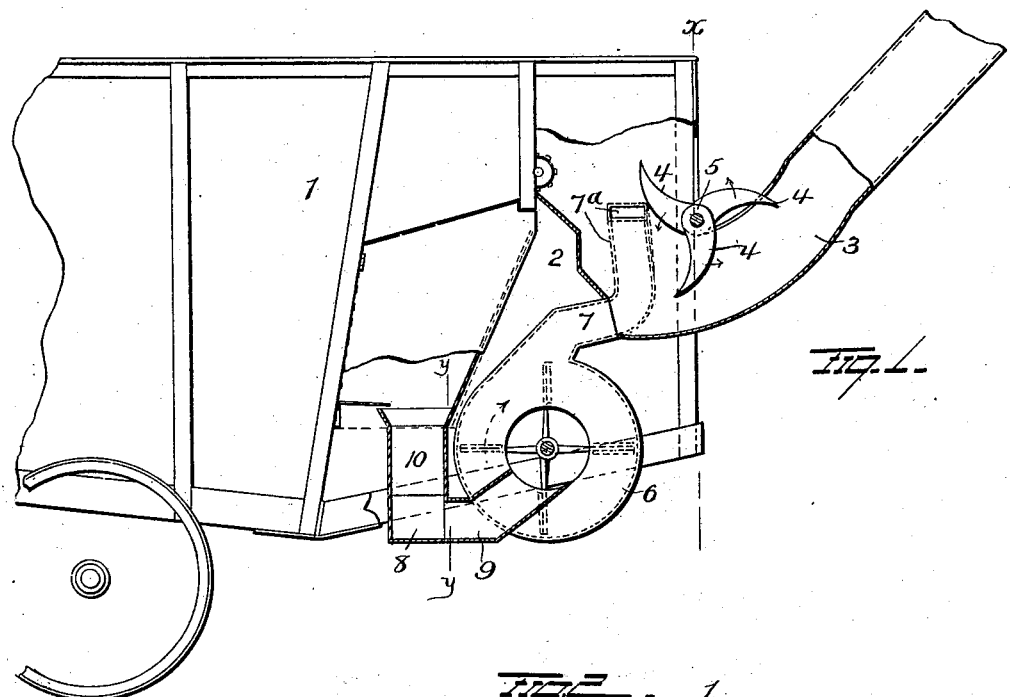
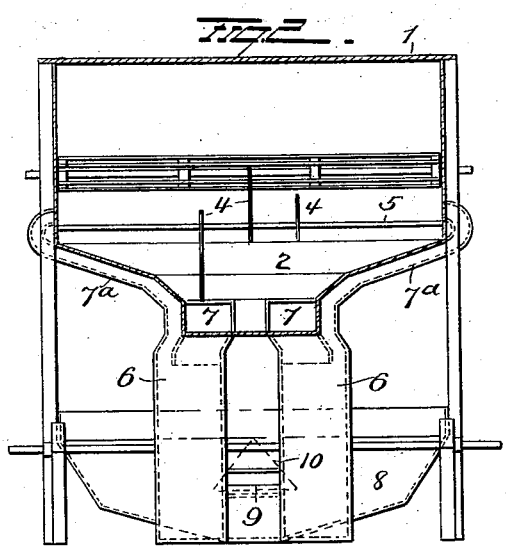
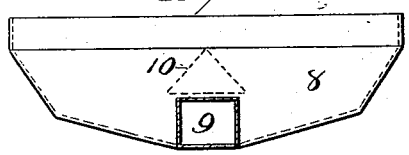
WITNESSES
INVENTOR
John Henry
By H. A. Seymour
Attorney No. 754,448.

Patented March 15, 1904.

UNITED STATES PATENT OFFICE.

JOHN HENRY, OF GRAND FORKS, NORTH DAKOTA.

PNEUMATIC STACKER.

SPECIFICATION forming part of Letters Patent No. 754,448, dated March 15, 1904.

Application filed April 24, 1903. Serial No. 154,182. (No model.)

*To all whom it may concern:*

Be it known that I, JOHN HENRY, a resident of Grand Forks, in the county of Grand Forks and State of North Dakota, have invented certain new and useful Improvements in Pneumatic Stackers; and I do hereby declare the following to be a full, clear, and exact description of the invention, such as will enable others skilled in the art to which it appertains to make and use the same.

My invention relates to an improved pneumatic stacker, the object of the invention being to provide improved mechanism for feeding the straw into the stacker-tube to be taken up or conveyed by the air-blast to permit a better operation of the main air-blast and the use of a correspondingly smaller pipe, and, further, to provide an improved chaff-receptacle to insure the blast or suction removing all the chaff therefrom.

With these objects in view the invention consists in certain novel features of construction and combinations and arrangements of parts, as will be more fully hereinafter described, and pointed out in the claims.

In the accompanying drawings, Figure 1 is a view in longitudinal section. Fig. 2 is a view in cross-section on the line $xx$ of Fig. 1, and Fig. 3 is a view in section through the chaff-receptacle on the line $yy$ of Fig. 1.

1 represents the rear or discharge end of a threshing-machine supporting my improvements, as will be hereinafter explained.

2 represents a straw-hopper, into which the straw from the threshing-machine is discharged. The lower end of this hopper communicates with the top of a tube or pipe 3, through which the straw is blown onto the stack.

Suitable arms or blades 4 are secured upon a rotary shaft 5, mounted in bearings at the juncture of the hopper and conveyer-tube, which force the straw into the conveyer-tube, through which it is blown to the stack. The air-draft is supplied by fans mounted in suitable casings 6, and having each a spout 7 to direct the air into tube 3, and each of said casings has a small discharge-pipe $7^a$, which communicates with the inclined sides of the hopper and discharges a blast along the inclined walls of the hopper to direct the straw into the path of the feeder arm or blades.

Behind the fan-casings and communicating with the interior of the threshing-machine is my improved chaff-receptacle 8, whose bottom inclines to its center, preferably as shown in Fig. 3, and a suction-pipe 9, communicating with fan-casings 6, also communicates with this chaff-receptacle near its bottom to draw the chaff therefrom and direct it either into main tube 3 or through separate pipes to any desired point of discharge.

In the central portion of the chaff-receptacle a deflector 10 is located and adapted to deflect the chaff to both sides, compelling it to be fed uniformly from both sides to the tapering center of the receptacle and be drawn therefrom through pipe 9.

Suitable driving-pulleys may be secured on the feed-arms and fan-shafts and motion transmitted thereto in any desired manner.

In operation the straw falls into hopper 2 and is taken up by the rotating arms or blades 4 and forced into the conveyer-tube, and as the arms turn in the tube it will be seen that they give the straw its initial movement in the tube as well, and it is taken up by the wind or air blast and forced onto the stack, the chaff falls into its receptacle 8 and is drawn through pipe 9 by the suction of the fans and is discharged through tube 3 or through a separate pipe, as above explained.

With my improvements above explained all bunches of straw which may be entangled or stick together due to moisture or other cause are separated by the arms or stirrers 4 in passing through the hopper and uniformly fed to the conveyer-tube, and hence the straw enters the tube 3 and cannot clog in the hopper, and as the auxiliary blast discharges against the opposite inclined sides of the hopper there is little if any possibility of the hopper clogging or stopping up by the accumulation of straw at any point, and this auxiliary blast and agitator or stirrer arms so facilitates the feed that I am enabled to employ a smaller conveyer-tube than heretofore and with far less liability of its becoming clogged with straw.

Various changes might be made in the general form and arrangement of the parts described without departing from my invention, and hence I do not confine myself to the precise details set forth, but consider myself at liberty to make such slight changes and alterations as fairly fall within the spirit and scope of my invention.

Having fully described my invention, what I claim as new, and desire to secure by Letters Patent, is—

1. In a pneumatic stacker, the combination with a straw-receiving hopper and a pneumatic stack with which said hopper communicates, of a mechanical feeding device at the juncture of the hopper and stack, and means for forcing air into the hopper in rear of said mechanical feeding device.

2. In a pneumatic stacker, the combination with a conveyer-tube and means for forcing an air-blast therethrough, of a hopper having inclined walls and discharging into the conveyer-tube, mechanical means for forcing the straw from the hopper into the conveyer-tube, and auxiliary air-blasts discharging into the hopper along its inclined walls to force the straw in the direction of its feed and concentrate it to the center in the path of the mechanical feeders.

3. In a pneumatic stacker, the combination with a straw-receiving hopper, of a tube into which the straw is directed by the hopper, a fan-casing communicating with the tube and a fan in said casing to direct an air-blast through the tube, auxiliary air-blast pipes through which air is forced by the fan into the hopper, and mechanical means for assisting this auxiliary air-blast to force the straw into the conveyer-tube.

4. In a pneumatic stacker, the combination with a tube into which the straw is directed, and means for directing an air-blast through said tube, of a chaff-receptacle inclining or sloping downward to its center, and a suction-pipe communicating with the chaff-receptacle at its center to draw the chaff therefrom.

5. In a pneumatic stacker, the combination with a tube into which the straw is directed, and means for directing an air-blast through said tube, of a chaff-receptacle inclining or sloping downward to its center, a deflector in the central portion of the chaff-receptacle, and a suction-pipe communicating with the chaff-receptacle at its center below the deflector to draw the chaff therefrom.

In testimony whereof I have signed this specification in the presence of two subscribing witnesses.

JOHN HENRY.

Witnesses:
S. W. FOSTER,
S. G. NOTTINGHAM.